United States Patent
Mori

(10) Patent No.: US 10,887,510 B2
(45) Date of Patent: Jan. 5, 2021

(54) PROCESSING APPARATUS, LENS APPARATUS AND IMAGE PICKUP APPARATUS FOR REDUCING THE SHIFT OF COMPOSITION DURING TILT PHOTOGRAPHY

(71) Applicant: CANON KABUSHIKI KAISHA, Tokyo (JP)

(72) Inventor: Takeo Mori, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 134 days.

(21) Appl. No.: 16/192,179

(22) Filed: Nov. 15, 2018

(65) Prior Publication Data
US 2019/0149727 A1 May 16, 2019

(30) Foreign Application Priority Data

Nov. 16, 2017 (JP) .................................. 2017-220541
Oct. 29, 2018 (JP) .................................. 2018-202615

(51) Int. Cl.
*H04N 5/228* (2006.01)
*H04N 5/232* (2006.01)

(52) U.S. Cl.
CPC ..... *H04N 5/23229* (2013.01); *H04N 5/23212* (2013.01)

(58) Field of Classification Search
None
See application file for complete search history.

(56) References Cited

U.S. PATENT DOCUMENTS

| 7,605,860 B2 * | 10/2009 | Saitoh | G03B 5/06 |
| | | | 348/345 |
| 9,829,681 B2 | 11/2017 | Mori | |
| 2013/0242156 A1 * | 9/2013 | Amanai | G02B 13/04 |
| | | | 348/333.01 |
| 2014/0071313 A1 * | 3/2014 | Hiasa | H04N 5/21 |
| | | | 348/231.99 |
| 2018/0348478 A1 | 12/2018 | Mori | |

FOREIGN PATENT DOCUMENTS

JP 2010191078 A 9/2010

* cited by examiner

*Primary Examiner* — Gary C Vieaux
(74) *Attorney, Agent, or Firm* — Carter, DeLuca & Farrell LLP

(57) ABSTRACT

Provided is a processing apparatus, which is mounted to any one of a lens apparatus including an optical system and an image pickup apparatus for picking up an image formed by an optical system, in which the processing apparatus includes a determination unit configured to determine a first shift amount of a first shift lens unit and a second shift amount of a second shift lens unit, and both of the first shift lens unit and the second shift lens unit are included in the optical system, and movable in a direction having a component perpendicular to an optical axis direction. The determination unit determines the first and second shift amounts based on information representing an optical state of the optical system, optical information on each of the first and second shift lens units, which corresponds to the information, and information representing a predetermined object plane tilt amount.

18 Claims, 11 Drawing Sheets

PROCESSING APPARATUS, LENS APPARATUS AND IMAGE PICKUP APPARATUS FOR REDUCING THE SHIFT OF COMPOSITION DURING TILT PHOTOGRAPHY

BACKGROUND OF THE INVENTION

Field of the Invention

The present invention relates to a processing apparatus, a lens apparatus and an image pickup apparatus.

Description of the Related Art

There has been known a tilt photography function, which enables an entire object plane tilted in an optical axis direction of an image pickup optical system to be in focus. As an optical system for achieving the tilt photography, there has been known an image pickup optical system including a tilt mechanism. The Scheimpflug principle is used as the principle of the tilt photography, and this image pickup optical system is also called "Scheimpflug optical system". Meanwhile, in some cases, in the image pickup optical system including the tilt mechanism, a composition may be shifted (shift of composition occurs) when the optical system is tilted, resulting in deterioration of usability.

Hitherto, there has been known an image pickup apparatus capable of reducing a shift of composition that occurs when an optical system is tilted. In Japanese Patent Application Laid-Open No. 2010-191078, there is disclosed an image pickup apparatus in which a rotation center position of a tilt mechanism and a rear principal point position of an image pickup optical system are brought closer to each other as much as possible in an optical axis direction, to thereby reduce the shift of composition.

In the image pickup optical system including the tilt mechanism, a lens barrel moves in its rotational direction about any point on the optical axis. Therefore, in general, the size of a lens holding mechanism tends to increase. In addition, the shift of composition is generally reduced by bringing the rear principal point position and the tilt center position of the image pickup optical system closer to each other, and hence, depending on the type of optical system, it is difficult to perform the tilt photography while reducing the shift of composition.

SUMMARY OF THE INVENTION

It is an object of the present invention to provide a processing apparatus, lens apparatus and an image pickup apparatus, each of which enables tilt photography to be performed with a small shift of composition.

The processing apparatus according to the present invention is a processing apparatus, which is mounted to any one of a lens apparatus including an optical system and an image pickup apparatus configured to pick up an image formed by an optical system, in which the processing apparatus includes a determination unit configured to determine a first shift amount of a first shift lens unit and a second shift amount of a second shift lens unit, and both of the first shift lens unit and the second shift lens unit are included in the optical system, and movable in a direction having a component perpendicular to an optical axis direction. The determination unit is configured to determine the first shift amount and the second shift amount based on information representing an optical state of the optical system, optical information on each of the first shift lens unit and the second shift lens unit, which corresponds to the information, and information representing a predetermined object plane tilt amount.

Further features of the present invention will become apparent from the following description of exemplary embodiments with reference to the attached drawings.

DESCRIPTION OF THE EMBODIMENTS

Figure 1A:
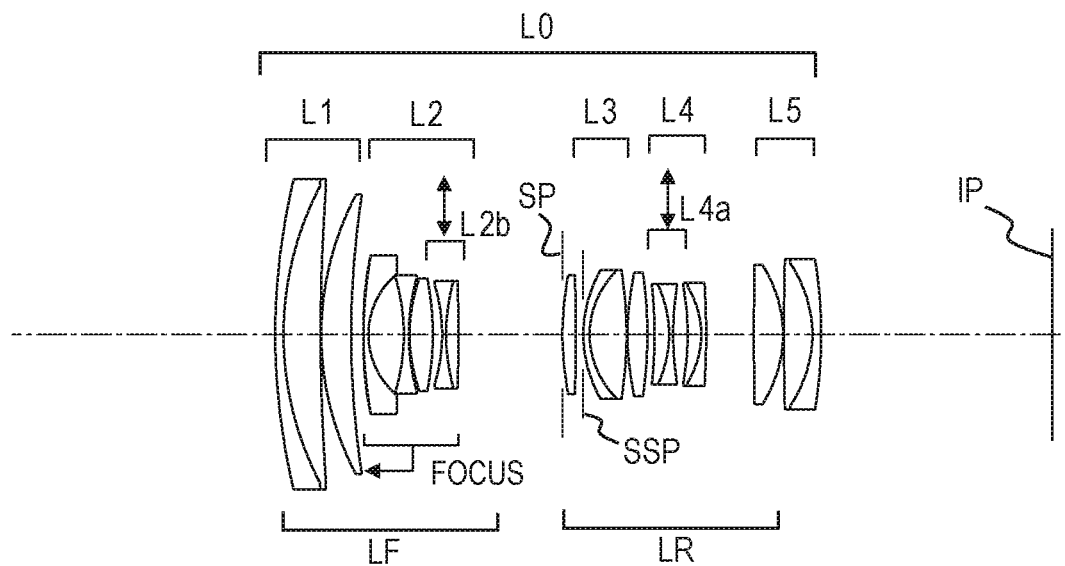
FIG. 1A is a lens cross-sectional view of a zoom lens in Example 1 of the present invention at a wide angle end when the zoom lens is focused on infinity.

Preferred embodiments of the present invention will now be described in detail in accordance with the accompanying drawings.

Now, features of a lens apparatus (optical apparatus) according to at least one embodiment of the present invention are described. An optical system included in the lens apparatus according to at least one embodiment of the present invention consists of, in order from an object side to an image side, a front unit, an aperture stop, and a rear unit. In this case, the optical system includes a first shift lens unit and a second shift lens unit, which are each independently movable in a direction having a component perpendicular to an optical axis direction.

The lens apparatus includes a detection unit configured to detect a focus position of the optical system. The lens apparatus includes a storing unit configured to store positional information on each of an object plane, an image plane, and a principal plane at the focus position of the optical system, an image plane tilt sensitivity of each of the first shift lens unit and the second shift lens unit, and a composition shift sensitivity of each of the first shift lens unit and the second shift lens unit. The lens apparatus includes a control unit configured to control movement of each of the first shift lens unit and the second shift lens unit based on information from the detection unit and the storing unit and on a predetermined object plane tilt amount.

The lens apparatus includes a plurality of lens units, and includes the optical system including at least two shift lens units including the first shift lens unit and the second shift lens unit, which are each configured to independently move in the direction having a component perpendicular to the optical axis direction.

The lens apparatus includes the following units. The lens apparatus includes a detection unit configured to detect the focus position (and zoom position) of the optical system. The lens apparatus includes a data retention unit (storing unit) configured to store the positional information on each of the object plane, the image plane, and the principal plane at the focus position (and zoom position) of the optical system, the image plane tilt sensitivity of each of the first shift lens unit and the second shift lens unit, and the composition shift sensitivity of each of the first shift lens unit and the second shift lens unit. The lens apparatus includes an input unit configured to input a desired object plane tilt amount (predetermined object plane tilt amount) designated by a user.

The lens apparatus includes a calculation unit (processing apparatus) configured to calculate shift amounts for achieving the object plane tilt amount based on information from the detection unit, the data retention unit, and the input unit, and calculate a value for shifting each of the first shift lens unit and the second shift lens unit so as to correct the shift of composition when the optical system is tilted. The calculation unit is, for example, a central processing unit (CPU). The lens apparatus includes the control unit configured to control the movement of each of the first shift lens unit and the second shift lens unit based on the shift amounts from the calculation unit.

Figure 9:
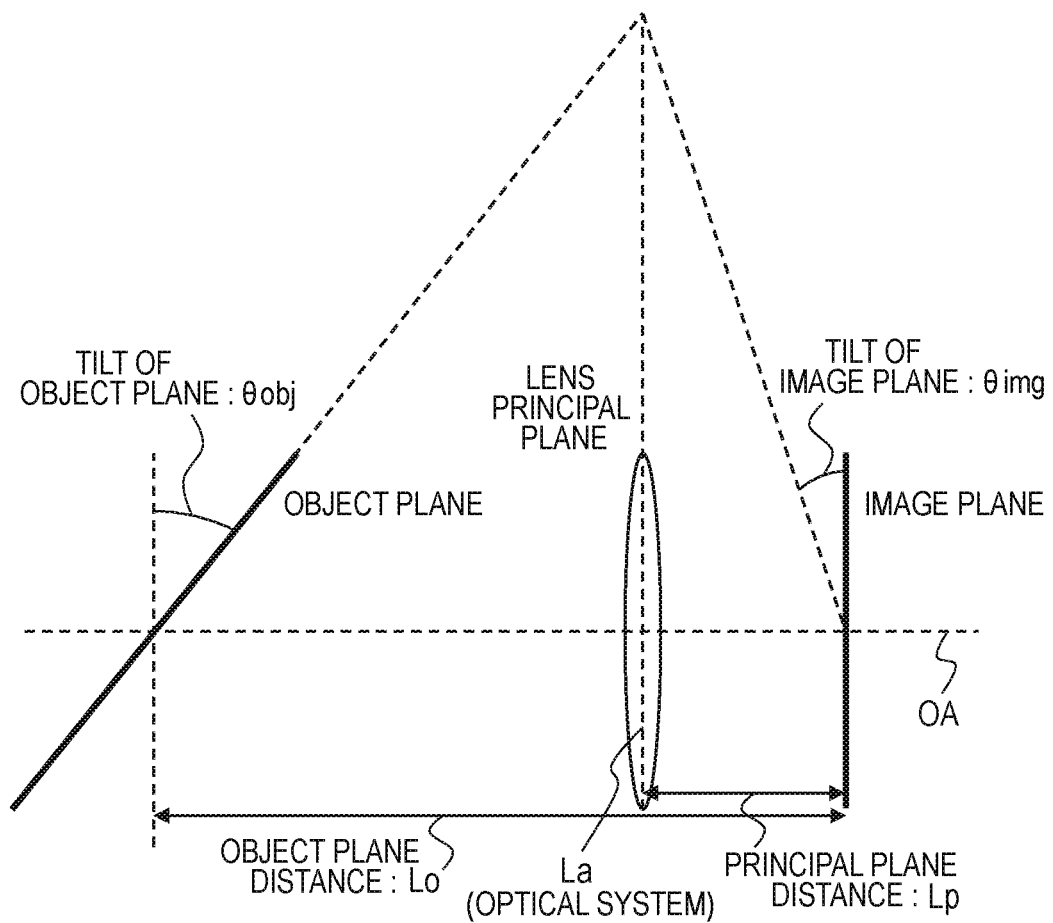
FIG. 9 is an explanatory diagram of the Scheimpflug principle.

FIG. 9 is an explanatory diagram of the Scheimpflug principle. Now, a principle of correction of the shift of composition in the optical system in at least one embodiment of the present invention is described. When a lens included in the optical system is decentered from an optical axis, coma or a tilt of an image plane occurs. In general, the optical system is designed such that a small aberration is generated when the lens is decentered. However, when the optical system is designed such that the tilt of the image plane due to decentering of a lens from the optical axis remains, an effect similar to that of the tilt photography can be obtained.

FIG. 9 is an illustration of a case in which the Scheimpflug principle is substantially satisfied through decentering of a lens of an optical system La. In order to enable an entire object plane tilted by an angle θobj from a vertical plane to be suitably in focus, according to the Scheimpflug principle, an image plane is required to be tilted by an angle θimg from the vertical plane with respect to a lens principal plane of the optical system La.

Thus, the inventors of the present invention have conceived that, through use of the tilt of the image plane due to decentering of a lens, the tilt of the image plane generated by the tilt θobj of the object plane is corrected, to thereby enable an entire object plane to be in focus even without tilting the image plane.

However, when the tilt of the object plane is to be secured in a case where the object plane is large, it is required to increase the tilt of the image plane due to decentering of a lens. In this case, the shift of composition is also disadvantageously increased. Therefore, in order to suitably correct the tilt of the image plane and correct the shift of composition, at least two lenses (lens portions) are decentered (shifted) from the optical axis, to thereby enable suitable tilt photography to be performed.

Figure 10:
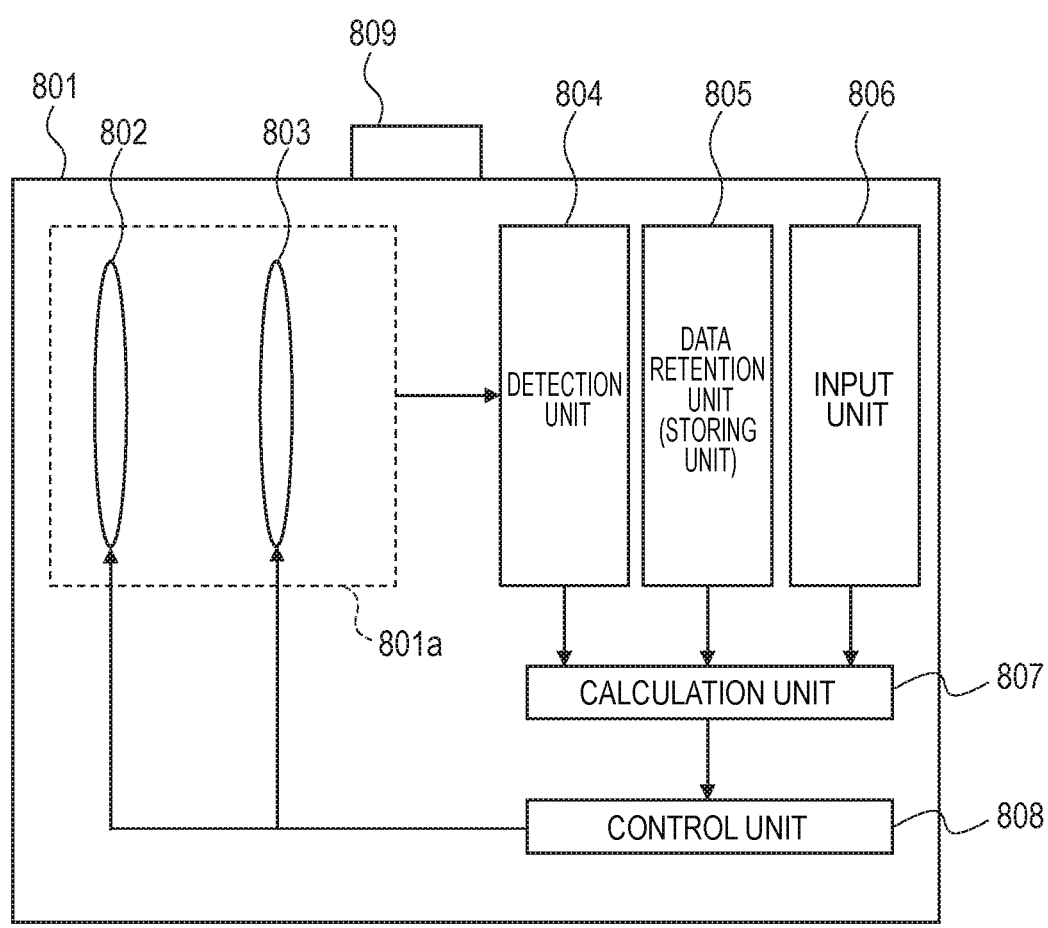
FIG. 10 is a diagram for schematically illustrating main parts of an optical apparatus according to one embodiment of the present invention.

Next, a lens apparatus 801 according to one embodiment of the present invention is described with reference to FIG. 10. FIG. 10 is a block diagram for illustrating main parts of the lens apparatus 801. The lens apparatus 801 includes an optical system 801a. The optical system 801a includes a first shift lens unit 802 and a second shift lens unit 803.

A detection unit 804 is a detection unit configured to detect an optical state. When the optical system 801a is a prime lens, the detection unit 804 detects information on a focus position. When the optical system 801a is a zoom lens, the detection unit 804 detects information on a focus position and information on a zoom position (focal length). The information on the focus position is information that changes depending on an object distance, such as a position of a focus lens and a rotation amount of an operation ring corresponding to the position of the focus lens. The information on the zoom position is information that changes depending on a focal length, such as a position of each lens unit and a rotation amount of a zoom ring.

A data retention unit 805 is a memory, for example, a read only memory (ROM), and is a unit configured to retain data representing a relationship between the optical state and optical characteristic data. The optical characteristic data is information that changes depending on, for example, the focus position and the zoom position, and may include, for example, the position of the object plane (object distance), the position of the image plane, the positional information on the principal plane of the optical system, and the information on the image plane tilt sensitivity and composition shift sensitivity of each of the first shift lens unit and the second shift lens unit, which are described above. In this case, the image plane tilt sensitivity represents an angle formed between the image plane and a paraxial image plane when a shift lens unit is moved by 1 mm with respect to the optical axis in a vertical direction.

An input unit 806 is a unit configured to input the object plane tilt amount (tilt amount of object plane) to the calculation unit 807. In this case, the object plane tilt amount is designated by the user through an operation member 809. The operation member 809 is only required to be an operation member that enables the user to input a numerical value of the object plane tilt amount desired by the user or to select a level of the object plane tilt amount from among multiple levels (e.g., large, medium, and small). Examples of the operation member 809 include an electronic monitor, a rotating dial, and an ON/OFF switch.

A calculation unit 807 reads out optical data required for calculation from the data retention unit 805 based on the information input from the detection unit 804, and calculates a shift amount of each of the first shift lens unit 802 and the second shift lens unit 803 based on the read-out information and the information input from the input unit 806.

A control unit 808 drives a drive mechanism (not shown) based on the shift amounts determined by the calculation unit 807, to thereby control the position of each of the first shift lens unit 802 and the second shift lens unit 803. Further, until the optical state of the optical system 801a or the predetermined object plane tilt amount changes, the control unit 808 keeps the position of each of the first shift lens unit 802 and the second shift lens unit 803 at a position decentered from the optical axis.

Next, details of calculation to be executed by the calculation unit 807 are specifically described.

In one embodiment of the present invention, the image plane at the time when a lens is decentered is defined as a straight line obtained by approximating, by a linear expression, an average image plane position of ten (10) meridional and sagittal planes per millimeter at a d-line at each image height. In addition, the composition shift sensitivity represents a composition shift amount at the time when a shift lens unit is moved by 1 mm with respect to the optical axis in the vertical direction. Specifically, the composition shift sensitivity is defined by the following expression.

$$(1-\beta i)\beta k$$

$\beta i$: Lateral magnification of decentered lens portion
$\beta k$: Combined lateral magnification of a lens system located on image side of decentered lens portion Further, based on the optical characteristic data in the optical state, the angle input from the input unit 806, and the Scheimpflug principle, correction of the tilt of the image plane and correction of the shift of composition are taken into consideration. The calculation unit 807 then calculates a lens shift amount (lens decentered amount) of each of the first shift lens unit 802 and the second shift lens unit 803.

The lens shift amount of each of the first shift lens unit 802 and the second shift lens unit 803 to be calculated by the calculation unit 807 is derived by solving the following simultaneous equations.

A distance from the paraxial image plane of the optical system 801a to the principal plane is represented by Lp. A distance from the paraxial image plane of the optical system 801a to the object plane is represented by Lo. The image plane tilt sensitivity of the first shift lens unit 802 is represented by T1. The composition shift sensitivity of the first shift lens unit 802 is represented by S1. The shift amount of the first shift lens unit 802 is represented by M1.

The image plane tilt sensitivity of the second shift lens unit 803 is represented by T2. The composition shift sensitivity of the second shift lens unit 803 is represented by S2. The shift amount of the second shift lens unit 803 is represented by M2. An object plane tilt amount is represented by θobj. An image plane tilt amount obtained based on the Scheimpflug principle is represented by θimg.

In this case, the image plane tilt amount θimg is expressed as follows.

$$\theta img = \tan^{-1}(Lp \times \tan \theta obj/(Lo-Lp))$$

At this time, the following expressions are satisfied.

$$M1 \times S1 + M2 \times S2 = 0 \tag{1X}$$

$$M1 \times T1 + M2 \times T2 = \theta img \tag{2X}$$

The expression (1X) is an expression relating to the shift of composition, and represents a relationship in which the shift of composition due to the shift of each shift lens unit is canceled. The expression (2X) is an expression relating to the tilt of the image plane, and represents a relationship in which the tilt of the image plane due to the shift of each shift lens unit matches the image plane tilt amount obtained based on the Scheimpflug principle. When the shift amount of the first shift lens unit 802 and the shift amount of the second shift lens unit 803 are set so as to satisfy the expression (1X) and the expression (2X), it is possible to reduce the shift of composition while satisfying a desired image plane tilt amount.

However, those relationships are not required to be strictly satisfied, and as long as the value falls within a certain numerical range, the tilt photography can be performed without occurrence of such a shift of composition as to cause a sense of strangeness for user's eyes. Thus, the calculation unit 807 calculates the shift amount of the first shift lens unit 802 and the shift amount of the second shift lens unit 803 so as to satisfy the following conditional expressions (1) and (2). This facilitates the tilt photography with a reduced shift of composition without practical problems.

$$0.3 < -M1 \times S1/M2 \times S2 < 1.7 \tag{1}$$

$$0.3 < (M1 \times T1 + M2 \times T2)/\theta img < 1.7 \tag{2}$$

When the value falls below the lower limit value of the conditional expression (1), correction of the shift of composition by the second shift lens unit becomes disadvantageously insufficient. When the value exceeds the upper limit value of the conditional expression (1), correction of the shift of composition by the second shift lens unit becomes disadvantageously excessive.

When the value falls below the lower limit value of the conditional expression (2), correction of the tilt of the image plane becomes disadvantageously insufficient. When the value exceeds the upper limit value of the conditional expression (2), correction of the tilt of the image plane becomes disadvantageously excessive.

It is more preferred that the calculation unit 807 calculate the shift amount of each of the first shift lens unit 802 and the second shift lens unit 803 so as to satisfy numerical ranges of the following conditional expression (1a) and conditional expression (2a).

$$0.9 < -M1 \times S1/M2 \times S2 < 1.1 \tag{1a}$$

$$0.9 < (M1 \times T1 + M2 \times T2)/\theta img < 1.1 \tag{2a}$$

As described above, the calculation unit 807 first executes a step of acquiring information representing the optical state of the optical system 801a, optical information on each of the first shift lens unit 802 and the second shift lens unit 803, which corresponds to the information, and information representing the predetermined object plane tilt amount. The information representing the optical state includes the focus position and the zoom position (in the case of a zoom lens). Further, the information representing the optical state may include the position of the object plane, the position of the image plane, and the position of the principal plane.

Next, the calculation unit 807 executes a step of determining the shift amount of each of the first shift lens unit 802 and the second shift lens unit 803 based on the pieces of information acquired in the above-mentioned step.

The input unit 806, the data retention unit 805, and the calculation unit 807 are not necessarily required to be included in the lens apparatus 801. A part of structures in at least one of those units may be included in a camera.

For example, when the camera includes the calculation unit 807, the data retention unit 805 and the input unit 806 transmit to the camera, via a communicator (not shown) configured to enable communication between the lens apparatus 801 and the camera, the detection result obtained by the detection unit 804, the information retained in the data retention unit 805, and the object plane tilt amount to be input to the calculation unit 807. Further, the calculation unit 807 included in the camera calculates the shift amount of each of the first shift lens unit 802 and the second shift lens unit 803, and transmits the calculation results from the camera to the lens apparatus 801. The control unit 808 controls the position of each of the first shift lens unit 802 and the second shift lens unit 803 based on the received information.

Figure 11:
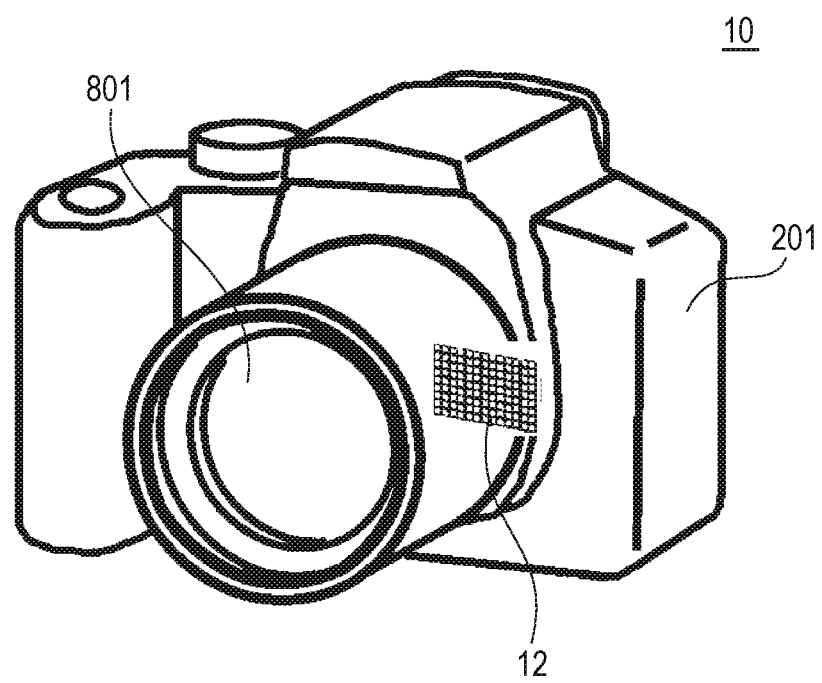
FIG. 11 is a diagram for schematically illustrating main parts of an image pickup apparatus.

FIG. 11 is a diagram for schematically illustrating main parts of an image pickup apparatus 10.

The calculation unit 807 may be included in the camera as the image pickup apparatus (optical apparatus) 10, which includes the optical system 801a, and is configured to pick up an image received by a light receiving element 12 configured to receive light of the image formed by the optical system 801a. As another example, the calculation unit 807 may be included in the camera 10, to and from which the lens apparatus including the optical system 801a is attachable and detachable, and which includes the light receiving element 12 configured to receive light of the image formed by the optical system 801a.

The operation member to be used by the user to designate a desired object plane tilt amount may be included in the camera 10. In this case, details of the operation are transmitted from the camera 10 to the lens apparatus 801. The input unit 806 of the lens apparatus 801 then inputs the object plane tilt amount based on the details of the operation to the calculation unit 807.

In the above description, the case in which the calculation unit 807 obtains the shift amount of each of the first shift lens unit 802 and the second shift lens unit 803 through calculation has been described. However, the shift amount of each of the first shift lens unit 802 and the second shift lens unit 803 may also be determined through use of, for example, a data table indicating a relationship between optical data and a shift amount.

Next, the optical systems 801a in exemplary Examples of the present invention are described. Examples 1 to 3 of the present invention each relate to a case in which the optical system 801a is a zoom lens (optical system having variable focal length), and Example 4 of the present invention relates to a case in which the optical system 801b is a prime lens. The present invention is applicable to any of the cases, but the present invention is particularly suitable for the zoom lens. This is because, in the case of the prime lens, the shift of composition can generally be reduced by bringing a rear principal point position and a tilt center position of the image pickup optical system closer to each other, whereas in the case of the zoom lens, a principal point position of the zoom lens and a lens interval between lenses change during zooming.

The optical system 801a in at least one Example of the present invention includes at least two shift lens units each configured to move so as to have a component perpendicular to the optical axis direction. Further, at least two lens units are shifted so that both of the tilt of the image plane and the shift of composition due to the tilt of the object plane are corrected.

Figure 1B:
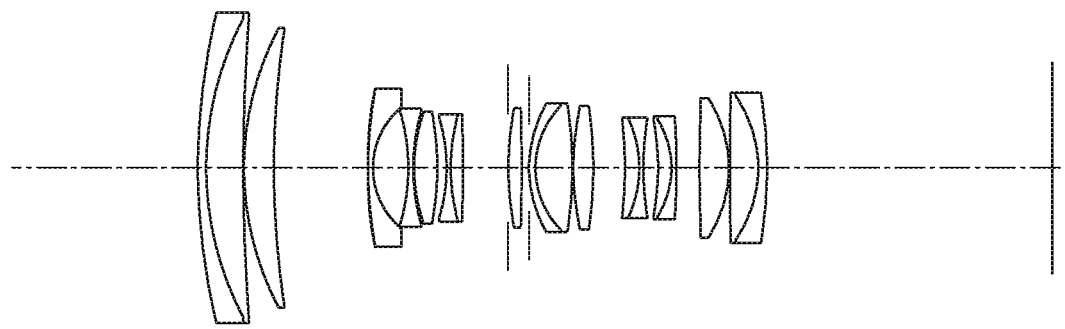
FIG. 1B is a lens cross-sectional view of the zoom lens in Example 1 at an intermediate zoom position when the zoom lens is focused on infinity.
Figure 1C:
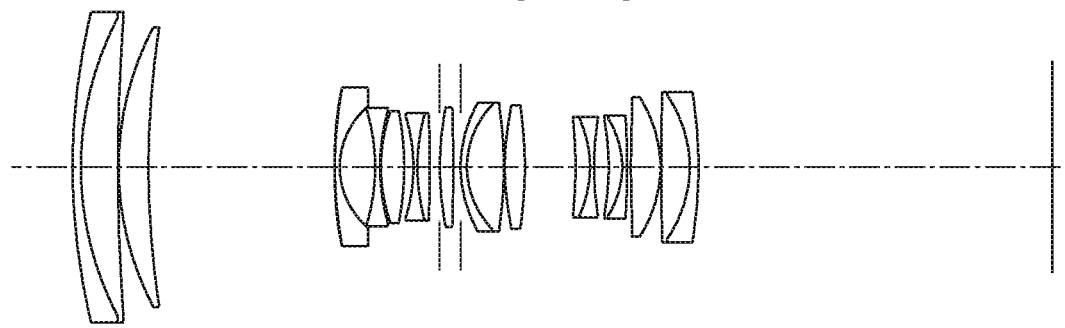
FIG. 1C is a lens cross-sectional view of the zoom lens in Example 1 at a telephoto end when the zoom lens is focused on infinity.
Figure 2A:
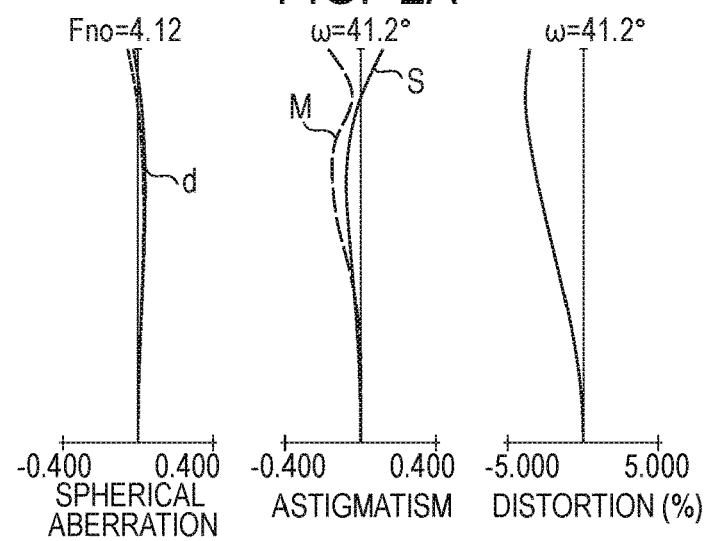
FIG. 2A is an aberration diagram of the zoom lens in Example 1 at the wide angle end when the zoom lens is focused on infinity.
Figure 2B:
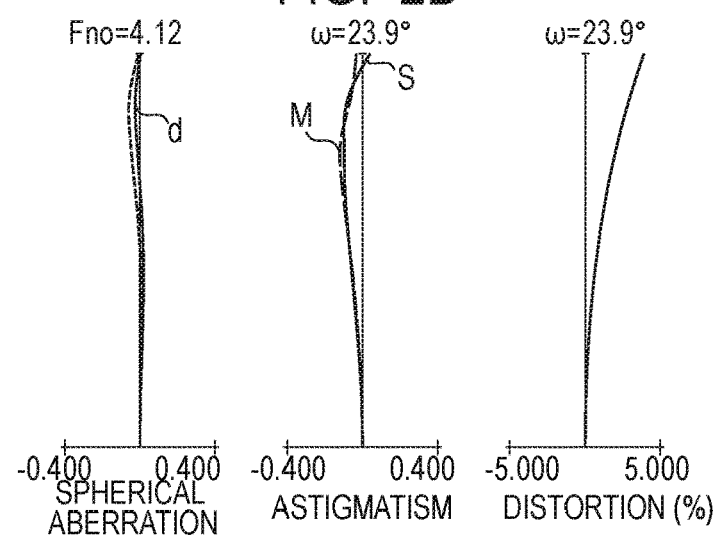
FIG. 2B is an aberration diagram of the zoom lens in Example 1 at the intermediate zoom position when the zoom lens is focused on infinity.
Figure 2C:
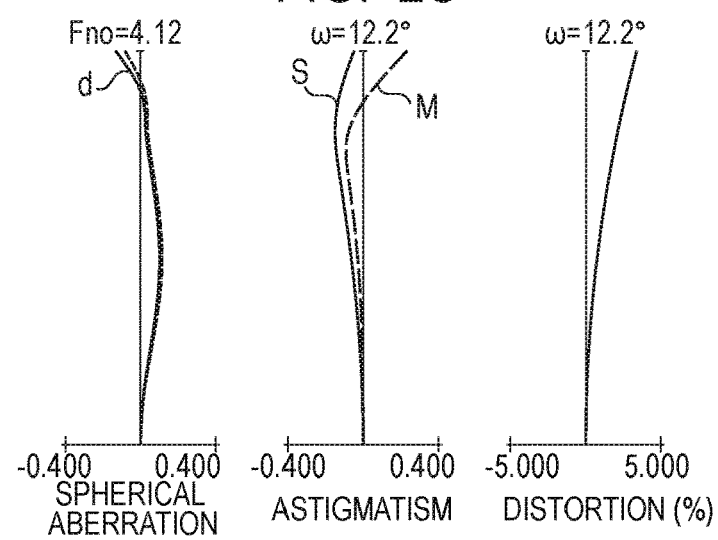
FIG. 2C is an aberration diagram of the zoom lens in Example 1 at the telephoto end when the zoom lens is focused on infinity.

FIG. 1A, FIG. 1B, and FIG. 1C are lens cross-sectional views of a zoom lens in Example 1 at a wide angle end, at an intermediate focal length, and at a telephoto end, respectively, when the zoom lens is focused on infinity. FIG. 2A, FIG. 2B, and FIG. 2C are aberration diagrams of the zoom lens in Example 1 at the wide angle end, at the intermediate focal length, and at the telephoto end, respectively, when the zoom lens is focused on infinity.

Figure 3A:
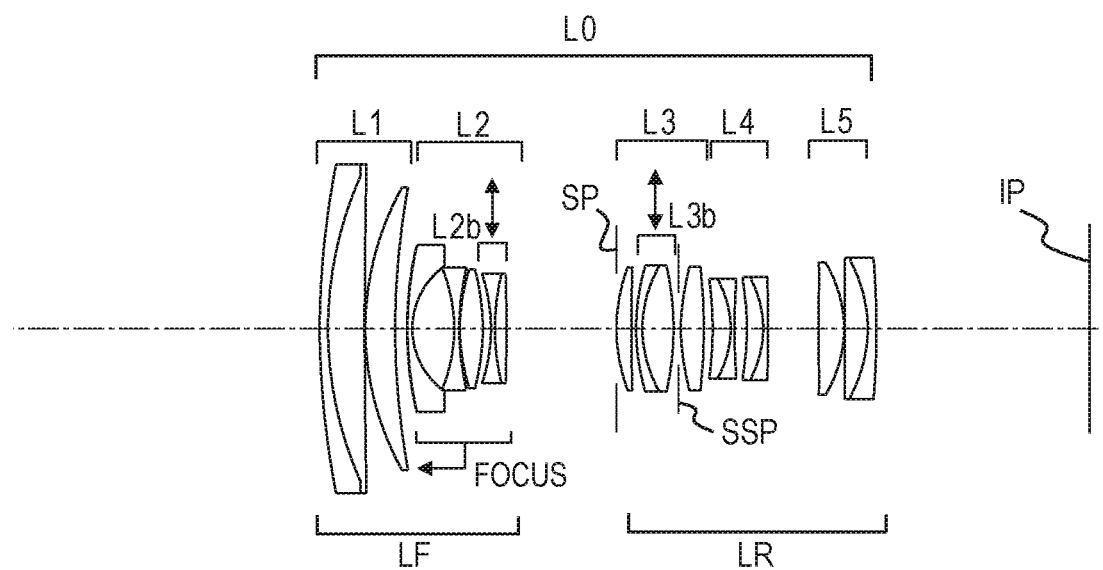
FIG. 3A is a lens cross-sectional view of a zoom lens in Example 2 of the present invention at a wide angle end when the zoom lens is focused on infinity.
Figure 3B:
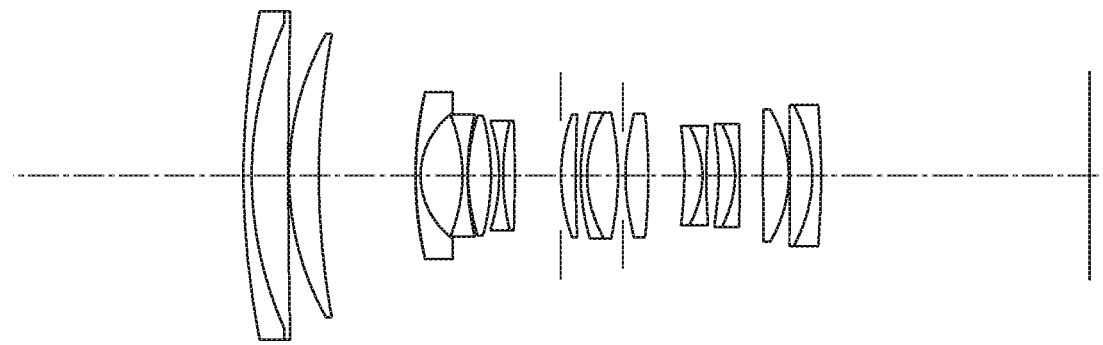
FIG. 3B is a lens cross-sectional view of the zoom lens in Example 2 at an intermediate zoom position when the zoom lens is focused on infinity.
Figure 3C:
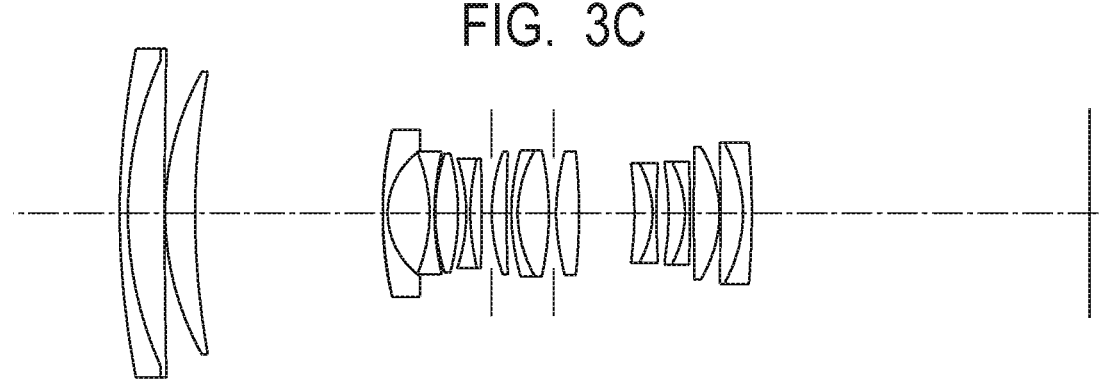
FIG. 3C is a lens cross-sectional view of the zoom lens in Example 2 at a telephoto end when the zoom lens is focused on infinity.
Figure 4A:
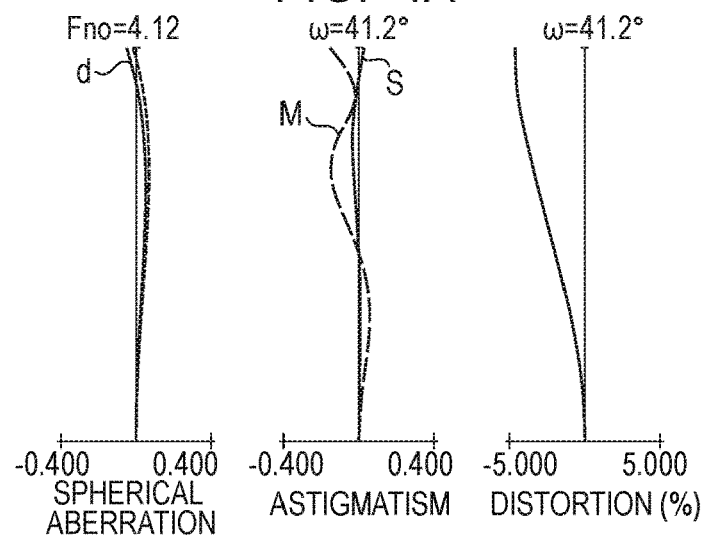
FIG. 4A is an aberration diagram of the zoom lens in Example 2 at the wide angle end when the zoom lens is focused on infinity.
Figure 4B:
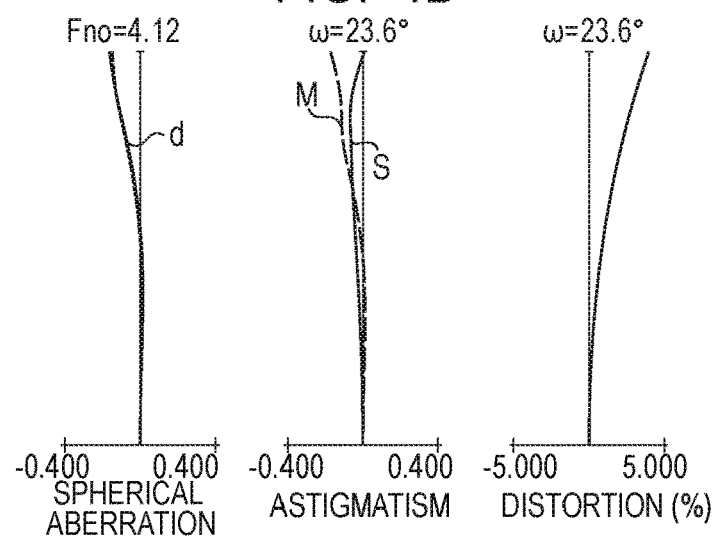
FIG. 4B is an aberration diagram of the zoom lens in Example 2 at the intermediate zoom position when the zoom lens is focused on infinity.
Figure 4C:
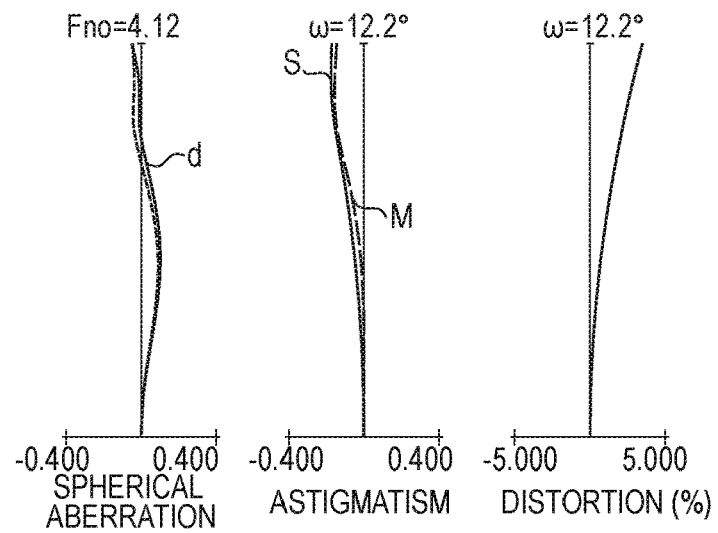
FIG. 4C is an aberration diagram of the zoom lens in Example 2 at the telephoto end when the zoom lens is focused on infinity.

FIG. 3A, FIG. 3B, and FIG. 3C are lens cross-sectional views of a zoom lens in Example 2 at a wide angle end, at an intermediate focal length, and at a telephoto end, respectively, when the zoom lens is focused on infinity. FIG. 4A, FIG. 4B, and FIG. 4C are aberration diagrams of the zoom lens in Example 2 at the wide angle end, at the intermediate focal length, and at the telephoto end, respectively, when the zoom lens is focused on infinity.

Figure 5A:
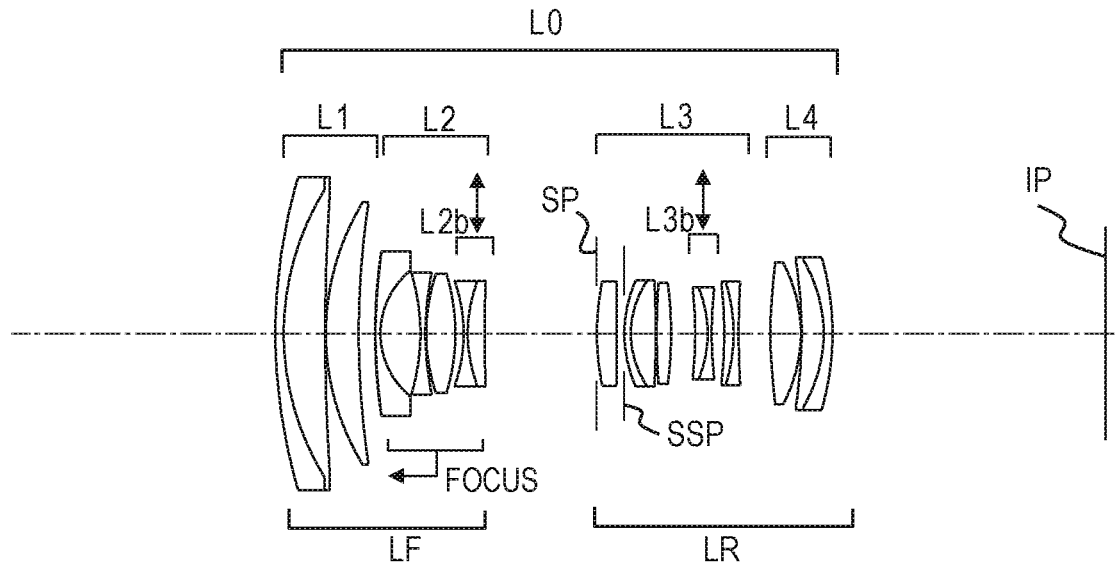
FIG. 5A is a lens cross-sectional view of a zoom lens in Example 3 of the present invention at a wide angle end when the zoom lens is focused on infinity.
Figure 5B:
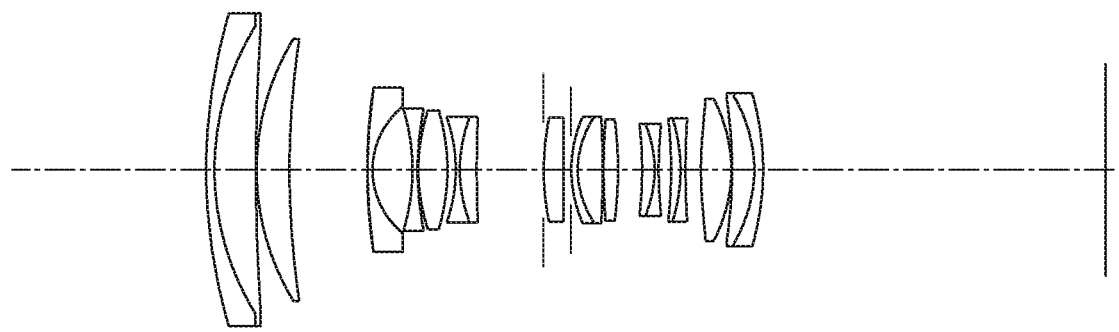
FIG. 5B is a lens cross-sectional view of the zoom lens in Example 3 at an intermediate zoom position when the zoom lens is focused on infinity.
Figure 5C:
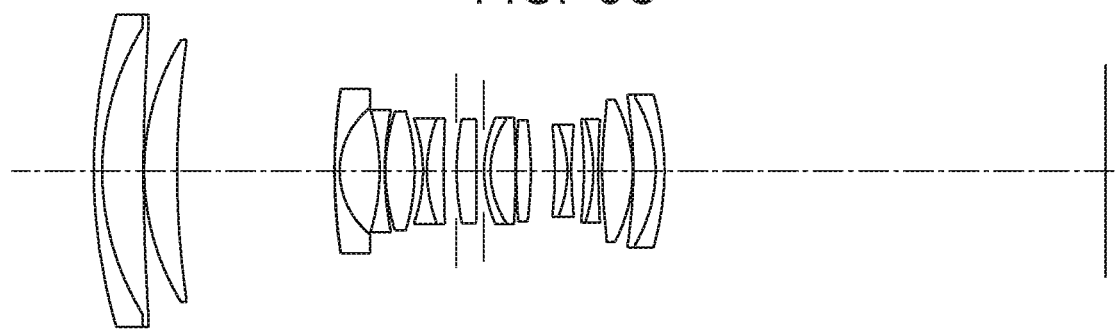
FIG. 5C is a lens cross-sectional view of the zoom lens in Example 3 at a telephoto end when the zoom lens is focused on infinity.
Figure 6A:
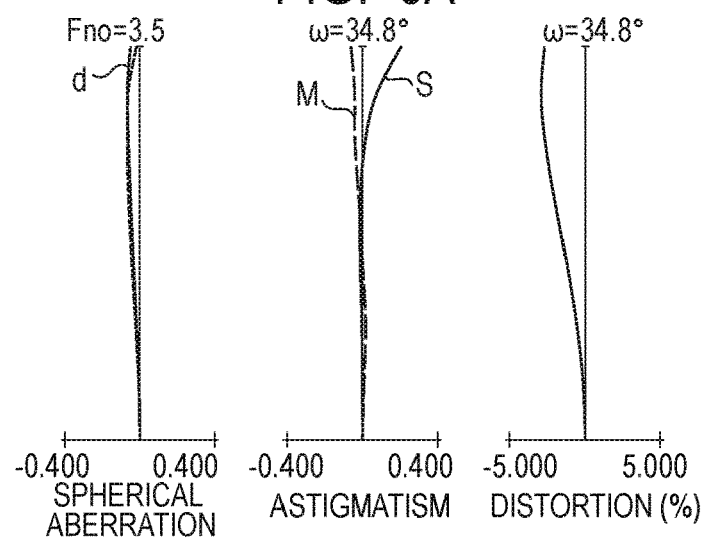
FIG. 6A is an aberration diagram of the zoom lens in Example 3 at the wide angle end when the zoom lens is focused on infinity.
Figure 6B:
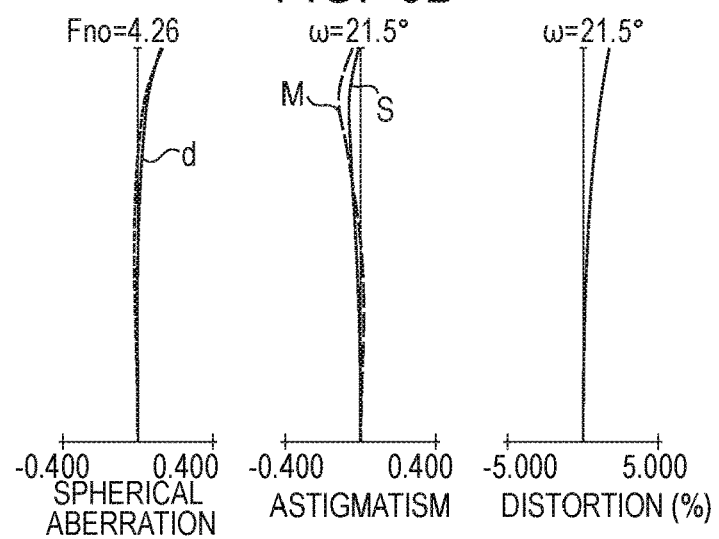
FIG. 6B is an aberration diagram of the zoom lens in Example 3 at the intermediate zoom position when the zoom lens is focused on infinity.
Figure 6C:
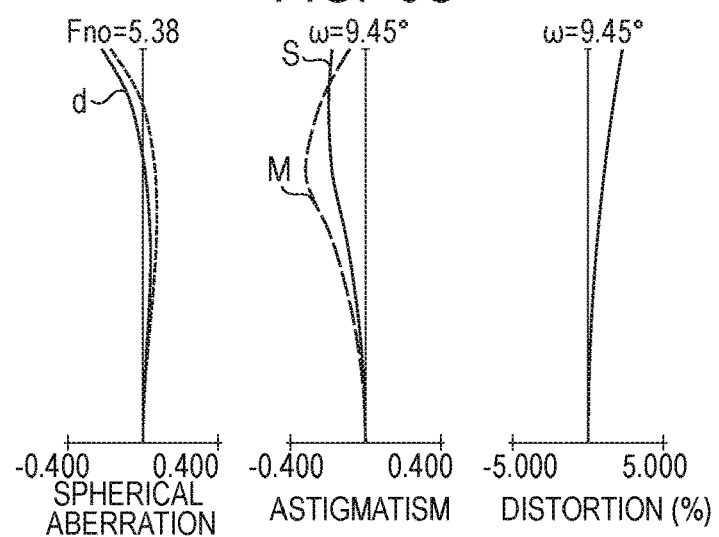
FIG. 6C is an aberration diagram of the zoom lens in Example 3 at the telephoto end when the zoom lens is focused on infinity.

FIG. 5A, FIG. 5B, and FIG. 5C are lens cross-sectional views of a zoom lens in Example 3 at a wide angle end, at an intermediate focal length, and at a telephoto end, respectively, when the zoom lens is focused on infinity. FIG. 6A, FIG. 6B, and FIG. 6C are aberration diagrams of the zoom lens in Example 3 at the wide angle end, at the intermediate focal length, and at the telephoto end, respectively, when the zoom lens is focused on infinity.

Figure 7:
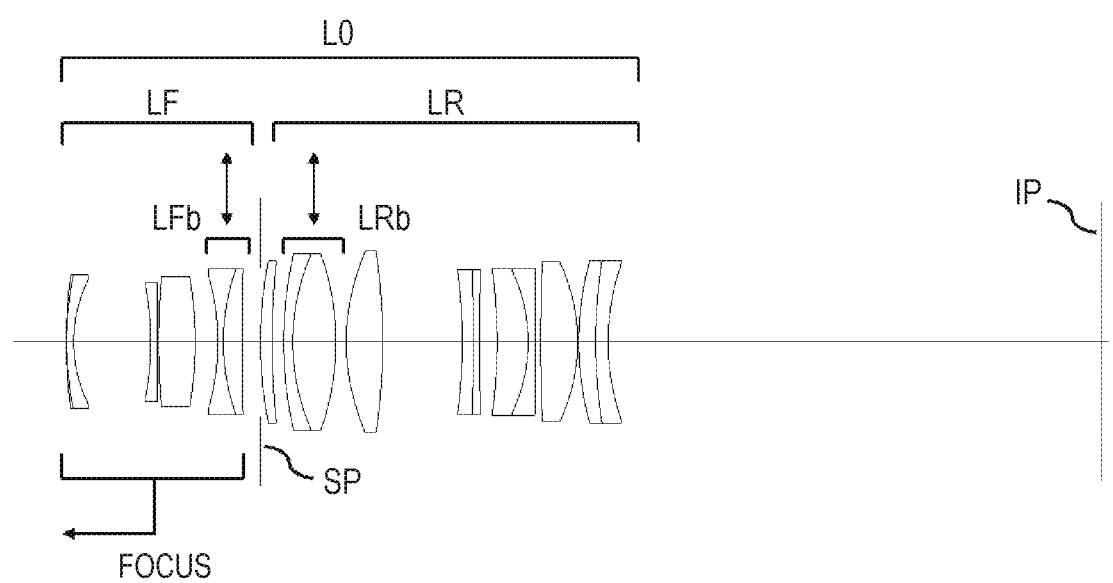
FIG. 7 is a lens cross-sectional view of a prime lens in Example 4 of the present invention when the prime lens is focused on infinity.
Figure 8:
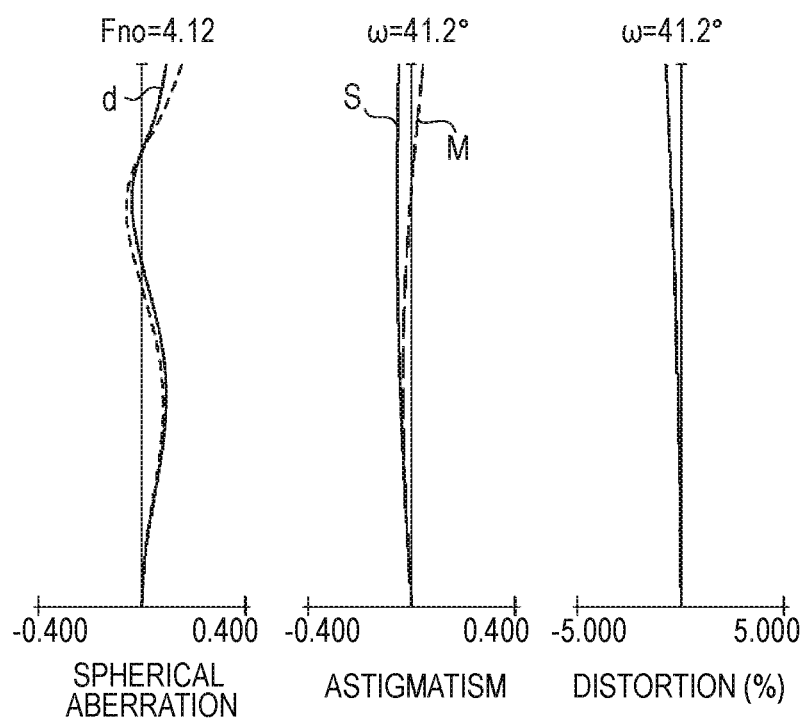
FIG. 8 is an aberration diagram of the prime lens in Example 4 when the prime lens is focused on infinity.

FIG. 7 is a lens cross-sectional view of a prime lens in Example 4 when the prime lens is focused on infinity. FIG. 8 is an aberration diagram of the prime lens in Example 4 when the prime lens is focused on infinity.

In the lens cross-sectional views, the left side is the object side (front side), and the right side is the image side (rear side). There are illustrated a lens L0, a front unit LF, and a rear unit LR. In the lens cross-sectional views of FIG. 1A to FIG. 1C and FIG. 3A to FIG. 3C, there are illustrated a first lens unit L1 having a positive refractive power, a second lens unit L2 having a negative refractive power, a third lens unit L3 having a positive refractive power, a fourth lens unit L4 having a negative refractive power, and a fifth lens unit L5 having a positive refractive power. In the lens cross-sectional views of FIG. 5A to FIG. 5C, there are illustrated a first lens unit L1 having a positive refractive power, a second lens unit L2 having a negative refractive power, a third lens unit L3 having a positive refractive power, and a fourth lens unit L4 having a positive refractive power.

The "lens unit" as used herein refers to a set of lenses including one or more lenses that are separated from one another by a lens interval along the optical axis, which changes during zooming.

There are also illustrated an aperture stop SP and an auxiliary stop (flare cut stop) SSP. The arrow regarding "focus" indicates a locus of movement of a lens unit during focusing from infinity to proximity. There is also illustrated an image plane IP. When the optical system is used as an image pickup optical system of a video camera or a digital still camera, the image plane IP corresponds to an image plane of a solid-state image pickup element (photoelectric conversion element), such as a CCD sensor or a CMOS sensor, which is configured to receive light of an image formed by the image pickup optical system.

In the spherical aberration diagrams, the solid line "d" indicates spherical aberration at a d-line (wavelength: 587.6 nm), and the dotted line indicates the sine condition. In the astigmatism diagrams, the broken line M indicates a meridional image plane at the d-line, and the solid line S indicates a sagittal image plane at the d-line. The symbol Fno represents an F-number. The symbol "ω" represents a half angle of view (degrees).

It is more preferred that the optical system consist of, on both sides of the aperture stop SP, the front unit LF having a negative refractive power as a whole and the rear unit LR having a positive refractive power as a whole. Further, it is preferred that each of the front unit LF and the rear unit LR include at least one lens portion among the at least two shift lens units each being capable of moving so as to have a component perpendicular to the optical axis direction.

The optical system 801a in Example 1 is a zoom lens. The zoom lens consists of, in order from the object side to the image side, the first lens unit L1 having a positive refractive power, the second lens unit L2 having a negative refractive power, the third lens unit L3 having a positive refractive power, the fourth lens unit L4 having a negative refractive power, and the fifth lens unit L5 having a positive refractive power. An interval between adjacent lens units is changed during zooming. A portion L2b of the second lens unit L2 serves as the first shift lens unit (802), and a portion L4a of the fourth lens unit L4 serves as the second shift lens unit (803).

The optical system 801a in Example 2 is a zoom lens. The zoom lens consists of, in order from the object side to the image side, the first lens unit L1 having a positive refractive power, the second lens unit L2 having a negative refractive power, the third lens unit L3 having a positive refractive power, the fourth lens unit L4 having a negative refractive power, and the fifth lens unit L5 having a positive refractive power. An interval between adjacent lens units is changed during zooming. A portion L2b of the second lens unit L2 serves as the first shift lens unit (802), and a portion L3b of the third lens unit L3 serves as the second shift lens unit (803).

The optical system 801a in Example 3 is a zoom lens. The zoom lens consists of, in order from the object side to the image side, the first lens unit L1 having a positive refractive power, the second lens unit L2 having a negative refractive power, the third lens unit L3 having a positive refractive power, and the fourth lens unit L4 having a positive refractive power. An interval between adjacent lens units is changed during zooming. A portion L2b of the second lens unit L2 serves as the first shift lens unit (802), and a portion L3b of the third lens unit L3 serves as the second shift lens unit (803).

The optical system 801a in Example 4 is a prime lens. The prime lens consists of, in order from the object side to the image side, the front unit LF having a negative refractive power, the aperture stop, and the rear unit LR having a positive refractive power. A portion LFb of the front unit serves as the first shift lens unit (802), and a portion LRb of the rear unit serves as the second shift lens unit (803).

On the basis of a method proposed by Matsui in the 23rd meeting of the Japan Society of Applied Physics (1962), a decentering aberration coefficient PE representing a tilt of an image plane at the time when an i-th lens unit is shifted with respect to the optical axis is given by the following expression.

$$(PE) = (\alpha_i - \alpha'_i)(P_1 + P_2 + \ldots + P_{i-1}) - \alpha'_i P_i$$

$P_i$: Petzval sum of i-th lens
$\alpha_i$: Incident angle of axial marginal ray of i-th lens
$\alpha'_i$: Exit angle of axial marginal ray of i-th lens When the decentering aberration coefficient PE is increased, the tilt of the image plane at the time of shifting the lens is increased, and a larger image plane tilt correction effect can be obtained. In the optical system in each Example, a portion of the front unit in which the exit angle α' is large in the negative direction is adopted so that the first term and the second term of the expression given above have the same sign, to thereby increase an image plane tilt correction effect.

As the second shift lens unit, a portion of the rear unit that has hitherto been adopted in an optical system having an image stabilization function is adopted, to thereby reduce deterioration of optical performance due to decentering of a lens while keeping the composition shift sensitivity.

Next, Numerical Data 1 to 4 of lenses in Examples 1 to 4 of the present invention are shown. In each Numerical Data, "i" represents the order of a surface from the object side, "ri" represents a curvature radius of the i-th lens surface, "di" represents a lens thickness or an air interval between the i-th surface and the (i+1)-th surface, and "ndi" and "vdi" represent a refractive index and an Abbe number of a material between the i-th surface and the (i+1)-th surface with respect to the d-line, respectively. Moreover, an effective diameter of the i-th surface is also shown. BF represents a back focus, and is expressed as a distance from the last lens surface to the image plane. A total lens length is a value obtained by adding the back focus to a distance from the first lens surface to the last lens surface.

A focal length and an F-number are also shown. A half angle of view is half an image pickup angle of view of the entire system. An image height is a maximum image height, which determines the half angle of view. Moreover, in lens unit data, there are shown a focal length, a length on the optical axis, an entrance pupil position, an exit pupil position, a front principal point position, and a rear principal point position of each lens unit. An aspherical shape is expressed by the following equation:

$$X = \frac{(1/R) \times R^2}{1 + \sqrt{1 - (1+K)(H/R)^2}} + A4 \times H^4 + A6 \times H^6 + A8 \times H^8 + A10 \times H^{10}$$

where the X axis corresponds to the optical axis direction, the H axis corresponds to the direction perpendicular to the optical axis, the light traveling direction is positive, R represents a paraxial curvature radius, K represents a conic constant, and A4, A6, A8, and A10 each represent an aspherical coefficient. In addition, [e+X] means [×10$^{+X}$], and [e−X] means [×10$^{-X}$]. The aspherical surface is indicated by adding "*" as a suffix to surface number. In addition, the part in which an interval "d" between optical surfaces is "(variable)" is changed during zooming, and the interval between surfaces in each focal length is shown in an annexed table. In addition, a relationship among the parameters, the conditional expressions, and the numerical data are shown in Table 1.

(Numerical Data 1)
Unit: mm

Surface data

| Surface Number | r | d | nd | vd | Effective diameter |
|---|---|---|---|---|---|
| 1 | 134.396 | 1.70 | 1.85478 | 24.8 | 62.09 |
| 2 | 65.474 | 7.55 | 1.59522 | 67.7 | 59.47 |
| 3 | 407.193 | 0.15 | | | 58.86 |
| 4 | 61.069 | 6.11 | 1.77250 | 49.6 | 55.71 |
| 5 | 187.285 | (Variable) | | | 54.71 |
| 6* | 136.698 | 0.04 | 1.51742 | 52.4 | 31.07 |
| 7 | 88.251 | 1.00 | 1.88300 | 40.8 | 31.01 |
| 8 | 16.210 | 7.24 | | | 23.56 |
| 9 | −40.422 | 1.00 | 1.77250 | 49.6 | 22.96 |
| 10 | 42.010 | 0.15 | | | 21.80 |
| 11 | 34.020 | 4.78 | 1.90366 | 31.3 | 21.76 |
| 12 | −58.437 | 1.88 | | | 21.01 |
| 13* | −35.239 | 0.80 | 1.77250 | 49.6 | 19.23 |
| 14 | 40.485 | 2.52 | 1.90366 | 31.3 | 20.40 |
| 15 | −323.606 | (Variable) | | | 20.77 |
| 16 (Stop) | ∞ | 0.05 | | | 22.11 |
| 17 | 63.183 | 2.73 | 1.49700 | 81.5 | 22.78 |
| 18 | −421.445 | 1.47 | | | 23.19 |
| 19 | ∞ | 0.05 | | | 23.80 |
| 20 | 26.180 | 1.30 | 1.84666 | 23.9 | 25.02 |
| 21 | 18.162 | 7.56 | 1.48749 | 70.2 | 24.20 |
| 22 | −81.700 | 0.15 | | | 24.28 |
| 23* | 50.677 | 4.11 | 1.48749 | 70.2 | 24.07 |
| 24 | −85.459 | (Variable) | | | 23.71 |
| 25 | −89.403 | 2.95 | 1.90366 | 31.3 | 19.30 |
| 26 | −23.767 | 0.80 | 1.77250 | 49.6 | 19.14 |
| 27 | 61.104 | 3.02 | | | 18.50 |
| 28 | −52.639 | 2.75 | 1.84666 | 23.8 | 18.36 |
| 29 | −18.534 | 1.00 | 1.91082 | 35.3 | 18.49 |
| 30 | −166.931 | (Variable) | | | 19.88 |
| 31* | 194.344 | 6.02 | 1.59282 | 68.6 | 26.18 |
| 32 | −25.978 | 0.15 | | | 27.23 |
| 33 | 569.402 | 5.82 | 1.49700 | 81.5 | 27.85 |
| 34 | −25.631 | 1.80 | 1.85478 | 24.8 | 27.98 |
| 35 | −93.285 | (Variable) | | | 29.45 |
| Image plane | ∞ | | | | |

Aspherical surface data

Sixth surface

K = 0.00000e+000    A4 = 1.23214e−005    A6 = −1.88534e−008
A8 = 8.60398e−012    A10 = 2.26861e−014

Thirteenth surface

K = 0.00000e+000    A4 = −3.34460e−006    A6 = 7.44927e−010
A8 = −3.31348e−012    A10 = −4.01931e−014

Twenty-third surface

K = 0.00000e+000    A4 = −8.46333e−006    A6 = 5.98398e−010
A8 = −4.56471e−011    A10 = 1.73769e−013

Thirty-first surface

K = 0.00000e+000    A4 = −9.47374e−006    A6 = 3.86037e−009
A8 = −1.55487e−011    A10 = 3.04251e−014

Various data
Zoom ratio 4.04

| Focal length | 24.73 | 48.81 | 99.92 | 34.70 | 68.09 |
|---|---|---|---|---|---|
| F-number | 4.28 | 4.36 | 4.41 | 4.32 | 4.38 |
| Half angle of view (degrees) | 41.18 | 23.91 | 12.22 | 31.94 | 17.63 |
| Image height | 21.64 | 21.64 | 21.64 | 21.64 | 21.64 |
| Total lens length | 158.57 | 174.33 | 199.91 | 164.45 | 186.28 |
| BF | 47.15 | 58.19 | 72.17 | 52.17 | 64.03 |
| d5 | 2.48 | 19.16 | 37.96 | 10.30 | 28.82 |
| d15 | 21.17 | 9.20 | 2.00 | 14.19 | 5.65 |
| d24 | 1.45 | 6.44 | 10.35 | 4.08 | 8.25 |
| d30 | 9.69 | 4.71 | 0.79 | 7.06 | 2.89 |
| d35 | 47.15 | 58.19 | 72.17 | 52.17 | 64.03 |
| Entrance pupil position | 30.71 | 60.11 | 115.09 | 42.90 | 84.77 |
| Exit pupil position | −84.24 | −64.09 | −51.49 | −72.98 | −57.92 |
| Front principal point position | 50.78 | 89.44 | 134.27 | 67.98 | 114.84 |
| Rear principal point position | 22.42 | 9.39 | −27.76 | 17.47 | −4.06 |

Lens unit data

| Unit | First surface | Focal length | Lens structure length | Front principal point position | Rear principal point position |
|---|---|---|---|---|---|
| 1 | 1 | 104.72 | 15.51 | 2.55 | −6.66 |
| 2 | 6 | −16.27 | 19.41 | 2.15 | −11.80 |
| 3 | 16 | 25.69 | 17.41 | 6.11 | −6.87 |
| 4 | 25 | −31.02 | 10.51 | 2.53 | −4.40 |
| 5 | 31 | 45.22 | 13.79 | 2.85 | −5.97 |

Single Lens data

| Lens | First surface | Focal length |
|---|---|---|
| 1 | 1 | −151.08 |
| 2 | 2 | 130.00 |
| 3 | 4 | 114.88 |
| 4 | 6 | −481.40 |
| 5 | 7 | −22.64 |
| 6 | 9 | −26.53 |
| 7 | 11 | 24.39 |
| 8 | 13 | −24.28 |
| 9 | 14 | 39.95 |
| 10 | 17 | 110.76 |
| 11 | 20 | −75.67 |
| 12 | 21 | 31.26 |
| 13 | 23 | 65.91 |
| 14 | 25 | 35.08 |
| 15 | 26 | −22.06 |
| 16 | 28 | 32.58 |
| 17 | 29 | −22.96 |
| 18 | 31 | 39.05 |
| 19 | 33 | 49.51 |
| 20 | 34 | −41.86 |

(Numerical Data 2)
Unit: mm

Surface data

| Surface Number | r | d | nd | vd | Effective diameter |
|---|---|---|---|---|---|
| 1 | 172.291 | 1.70 | 1.85478 | 24.8 | 66.61 |
| 2 | 77.456 | 7.56 | 1.59522 | 67.7 | 61.75 |
| 3 | 1,337.961 | 0.15 | | | 60.68 |
| 4 | 60.062 | 6.17 | 1.77250 | 49.6 | 57.16 |
| 5 | 161.821 | (Variable) | | | 56.13 |
| 6* | 96.548 | 0.04 | 1.51742 | 52.4 | 33.24 |
| 7 | 76.681 | 1.00 | 1.88300 | 40.8 | 33.17 |
| 8 | 16.005 | 8.67 | | | 24.75 |
| 9 | −32.691 | 1.00 | 1.77250 | 49.6 | 24.17 |
| 10 | 53.137 | 0.15 | | | 23.43 |

-continued (Numerical Data 2)
Unit: mm

| | | | | |
|---|---|---|---|---|
| 11 | 39.786 | 4.74 | 1.90366 31.3 | 23.47 |
| 12 | −47.307 | 1.69 | | 23.07 |
| 13* | −36.104 | 0.80 | 1.77250 49.6 | 21.37 |
| 14 | 46.961 | 2.41 | 1.90366 31.3 | 21.07 |
| 15 | −317.834 | (Variable) | | 21.43 |
| 16 (Stop) | ∞ | 0.05 | | 22.75 |
| 17 | 35.974 | 3.06 | 1.49700 81.5 | 24.05 |
| 18 | 316.157 | 1.00 | | 24.21 |
| 19 | 45.385 | 1.30 | 1.84666 23.8 | 24.82 |
| 20 | 25.773 | 6.45 | 1.48749 70.2 | 24.47 |
| 21 | −58.304 | 1.00 | | 24.67 |
| 22 | ∞ | 0.50 | | 24.51 |
| 23* | 40.984 | 4.75 | 1.48749 70.2 | 24.37 |
| 24 | −116.653 | (Variable) | | 23.89 |
| 25 | −74.473 | 3.73 | 1.90366 31.3 | 19.41 |
| 26 | −20.636 | 0.80 | 1.77250 49.6 | 19.26 |
| 27 | 153.064 | 2.55 | | 18.70 |
| 28 | −57.043 | 3.37 | 1.84666 23.8 | 18.41 |
| 29 | −21.782 | 1.00 | 1.91082 35.3 | 19.06 |
| 30 | −364.974 | (Variable) | | 20.16 |
| 31* | 184.622 | 5.35 | 1.59282 68.6 | 25.30 |
| 32 | −26.102 | 0.15 | | 26.15 |
| 33 | −3,270.213 | 4.72 | 1.49700 81.5 | 26.62 |
| 34 | −29.141 | 1.80 | 1.85478 24.8 | 26.75 |
| 35 | −175.367 | (Variable) | | 27.94 |
| Image plane | ∞ | | | |

Aspherical surface data

Sixth surface

K = 0.00000e+000   A4 = 8.39520e−006   A6 = −1.03339e−008
A8 = −1.75497e−011   A10 = 4.18060e−014

Thirteenth surface

K = 0.00000e+000   A4 = −2.45089e−006   A6 = 5.03394e−009
A8 = −3.47918e−011   A10 = 7.78884e−014

Twenty-third surface

K = 0.00000e+000   A4 = −7.90968e−006   A6 = −1.04055e−008
A8 = −3.30476e−011   A10 = −4.81703e−014

Thirty-first surface

K = 0.00000e+000   A4 = −1.29375e−005   A6 = 8.05464e−009
A8 = −3.63769e−011   A10 = 7.48488e−014

Various data
Zoom ratio 4.04

| | Wide angle | Intermediate | Telephoto |
|---|---|---|---|
| Focal length | 24.74 | 49.55 | 99.94 |
| F-number | 4.13 | 4.31 | 4.42 |
| Half angle of view (degrees) | 41.17 | 23.59 | 12.21 |
| Image height | 21.64 | 21.64 | 21.64 |
| Total lens length | 159.00 | 174.75 | 200.33 |
| BF | 43.99 | 55.44 | 69.75 |
| d5 | 2.50 | 19.96 | 38.74 |
| d15 | 22.65 | 9.50 | 1.99 |
| d24 | 1.82 | 7.43 | 11.42 |
| d30 | 10.38 | 4.77 | 0.78 |
| d35 | 43.99 | 55.44 | 69.75 |
| Entrance pupil position | 31.35 | 62.42 | 118.03 |
| Exit pupil position | −72.74 | −57.32 | −47.86 |
| Front principal point position | 50.84 | 90.19 | 133.04 |
| Rear principal point position | 19.25 | 5.89 | −30.19 |

Lens unit data

| Unit | First surface | Focal length | Lens structure length | Front principal point position | Rear principal point position |
|---|---|---|---|---|---|
| 1 | 1 | 106.34 | 15.57 | 2.77 | −6.46 |
| 2 | 6 | −16.51 | 20.51 | 2.30 | −12.84 |
| 3 | 16 | 26.89 | 18.11 | 6.28 | −7.57 |
| 4 | 25 | −37.17 | 11.45 | 2.79 | −4.37 |
| 5 | 31 | 53.30 | 12.02 | 1.76 | −5.81 |

Single Lens data

| Lens | First surface | Focal length |
|---|---|---|
| 1 | 1 | −166.00 |
| 2 | 2 | 137.82 |
| 3 | 4 | 120.46 |
| 4 | 6 | −720.73 |
| 5 | 7 | −23.08 |
| 6 | 9 | −26.07 |
| 7 | 11 | 24.55 |
| 8 | 13 | −26.31 |
| 9 | 14 | 45.42 |
| 10 | 17 | 81.38 |
| 11 | 19 | −72.65 |
| 12 | 20 | 37.61 |
| 13 | 23 | 62.83 |
| 14 | 25 | 30.58 |
| 15 | 26 | −23.49 |
| 16 | 28 | 39.88 |
| 17 | 29 | −25.47 |
| 18 | 31 | 38.94 |
| 19 | 33 | 59.13 |
| 20 | 34 | −41.12 |

(Numerical Data 3)
Unit: mm

Surface data

| Surface Number | r | d | nd | vd | Effective diameter |
|---|---|---|---|---|---|
| 1 | 111.258 | 1.70 | 1.85478 | 24.8 | 62.06 |
| 2 | 55.527 | 8.37 | 1.59522 | 67.7 | 56.91 |
| 3 | 416.433 | 0.15 | | | 55.72 |
| 4 | 51.082 | 6.67 | 1.77250 | 49.6 | 51.89 |
| 5 | 178.533 | (Variable) | | | 50.74 |
| 6* | 133.270 | 0.04 | 1.51742 | 52.4 | 32.04 |
| 7 | 111.299 | 1.00 | 1.88300 | 40.8 | 31.96 |
| 8 | 16.536 | 8.12 | | | 24.49 |
| 9 | −42.059 | 1.00 | 1.77250 | 49.6 | 23.61 |
| 10 | 61.033 | 0.15 | | | 22.97 |
| 11 | 37.938 | 5.93 | 1.90366 | 31.3 | 23.01 |
| 12 | −41.145 | 1.69 | | | 22.29 |
| 13* | −31.622 | 0.80 | 1.77250 | 49.6 | 20.19 |
| 14 | 29.324 | 3.42 | 1.90366 | 31.3 | 19.06 |
| 15 | 255.810 | (Variable) | | | 18.45 |
| 16 (Stop) | ∞ | 0.05 | | | 19.40 |
| 17 | 51.445 | 4.07 | 1.49700 | 81.5 | 19.73 |
| 18 | −579.058 | 1.47 | | | 20.00 |
| 19 | ∞ | 0.05 | | | 20.17 |
| 20 | 26.447 | 1.30 | 1.84666 | 23.9 | 20.41 |
| 21 | 18.872 | 5.08 | 1.48749 | 70.2 | 19.76 |
| 22 | −194.462 | 0.15 | | | 19.54 |
| 23* | 110.523 | 2.96 | 1.48749 | 70.2 | 19.39 |
| 24 | −76.468 | 4.86 | | | 19.02 |
| 25 | −82.293 | 2.54 | 1.90366 | 31.3 | 17.02 |
| 26 | −24.056 | 0.80 | 1.77250 | 49.6 | 16.87 |
| 27 | 84.133 | 2.55 | | | 17.45 |
| 28 | −88.322 | 1.89 | 1.84666 | 23.8 | 18.35 |
| 29 | −34.564 | 1.00 | 1.91082 | 35.3 | 18.77 |
| 30 | 161.738 | (Variable) | | | 19.81 |
| 31* | 78.589 | 6.19 | 1.59282 | 68.6 | 26.53 |
| 32 | −30.417 | 0.15 | | | 27.52 |
| 33 | −93.931 | 4.47 | 1.49700 | 81.5 | 27.97 |

-continued (Numerical Data 3)
Unit: mm

| | | | | | |
|---|---|---|---|---|---|
| 34 | −28.906 | 1.80 | 1.85478 | 24.8 | 28.37 |
| 35 | −54.933 | (Variable) | | | 29.72 |
| Image plane | ∞ | | | | |

Aspherical surface data

Sixth surface

K = 0.00000e+000   A4 = 4.51319e−006   A6 = −8.68261e−009
A8 = 1.44811e−011   A10 = −2.34311e−014

Thirteenth surface

K = 0.00000e+000   A4 = −8.90443e−007   A6 = 1.50758e−008
A8 = −2.18032e−010   A10 = 1.09326e−012

Twenty-third surface

K = 0.00000e+000   A4 = −7.56514e−006   A6 = −1.09041e−008
A8 = 5.46174e−011   A10 = −1.74537e−013

Thirty-first surface

K = 0.00000e+000   A4 = −9.63815e−006   A6 = 6.47507e−009
A8 = −1.06969e−011   A10 = 1.24712e−014

Various data
Zoom ratio 4.17

| | | | | | |
|---|---|---|---|---|---|
| Focal length | 31.15 | 55.06 | 129.92 | 39.12 | 83.69 |
| F-number | 4.52 | 5.96 | 6.08 | 5.97 | 6.07 |
| Half angle of view (degrees) | 34.78 | 21.45 | 9.45 | 28.94 | 14.49 |
| Image height | 21.64 | 21.64 | 21.64 | 21.64 | 21.64 |
| Total lens length | 168.22 | 182.25 | 205.02 | 173.45 | 192.88 |
| BF | 55.33 | 69.40 | 89.40 | 61.34 | 78.11 |
| d5 | 3.35 | 15.78 | 31.89 | 8.16 | 24.64 |
| d15 | 22.68 | 13.52 | 2.51 | 18.31 | 8.65 |
| d30 | 6.44 | 3.13 | 0.79 | 5.23 | 1.05 |
| d35 | 55.33 | 69.40 | 89.40 | 61.34 | 78.11 |
| Entrance pupil position | 37.62 | 66.34 | 130.05 | 47.12 | 97.45 |
| Exit pupil position | −67.74 | −50.18 | −40.98 | −60.55 | −41.90 |
| Front principal point position | 60.88 | 96.05 | 130.50 | 73.68 | 122.78 |
| Rear principal point position | 24.18 | 14.34 | −40.52 | 22.22 | −5.58 |

Lens unit data

| Unit | First surface | Focal length | Lens structure length | Front principal point position | Rear principal point position |
|---|---|---|---|---|---|
| 1 | 1 | 80.28 | 16.88 | 3.24 | −6.82 |
| 2 | 6 | −17.05 | 22.15 | 2.38 | −12.79 |
| 3 | 16 | 58.41 | 28.78 | −22.04 | −30.83 |
| 4 | 31 | 41.55 | 12.61 | 3.82 | −4.44 |

Single Lens data

| Lens | First surface | Focal length |
|---|---|---|
| 1 | 1 | −131.53 |
| 2 | 2 | 106.72 |
| 3 | 4 | 90.56 |
| 4 | 6 | −1,305.63 |
| 5 | 7 | −22.11 |
| 6 | 9 | −32.10 |
| 7 | 11 | 22.65 |
| 8 | 13 | −19.58 |
| 9 | 14 | 36.39 |
| 10 | 17 | 95.27 |
| 11 | 20 | −84.47 |
| 12 | 21 | 35.57 |
| 13 | 23 | 93.20 |
| 14 | 25 | 36.85 |
| 15 | 26 | −24.14 |
| 16 | 28 | 66.01 |

(Numerical Data 3)
Unit: mm

| | | | | | |
|---|---|---|---|---|---|
| 17 | 29 | −31.19 | | | |
| 18 | 31 | 37.79 | | | |
| 19 | 33 | 82.14 | | | |
| 20 | 34 | −73.72 | | | |

(Numerical Data 4)
Unit: mm

Surface data

| Surface Number | r | d | nd | vd | Effective diameter |
|---|---|---|---|---|---|
| 1* | 82.766 | 0.04 | 1.51742 | 52.4 | 17.93 |
| 2 | 49.712 | 1.00 | 1.88300 | 40.8 | 17.73 |
| 3 | 20.196 | 11.05 | | | 16.53 |
| 4 | −42.274 | 1.00 | 1.77250 | 49.6 | 15.26 |
| 5 | 4,374.406 | 0.15 | | | 15.90 |
| 6 | 115.986 | 5.21 | 1.90366 | 31.3 | 16.19 |
| 7 | −55.511 | 3.26 | | | 17.37 |
| 8* | −34.562 | 0.80 | 1.77250 | 49.6 | 18.03 |
| 9 | 31.331 | 2.75 | 1.90366 | 31.3 | 19.38 |
| 10 | 1,262.443 | 2.51 | | | 19.76 |
| 11 | ∞ | 0.05 | | | 21.27 |
| 12 | 60.528 | 1.67 | 1.49700 | 81.5 | 21.91 |
| 13 | 113.992 | 1.66 | | | 22.23 |
| 14 | 57.638 | 1.30 | 1.84666 | 23.8 | 23.39 |
| 15 | 31.234 | 6.17 | 1.48749 | 70.2 | 23.56 |
| 16 | −38.322 | 1.00 | | | 24.12 |
| 17 (Stop) | ∞ | 0.50 | | | 24.47 |
| 18* | 30.882 | 5.22 | 1.48749 | 70.2 | 24.82 |
| 19 | −89.068 | 11.42 | | | 24.48 |
| 20 | −78.191 | 1.62 | 1.90366 | 31.3 | 19.60 |
| 21 | −219.309 | 0.80 | 1.77250 | 49.6 | 19.41 |
| 22 | 220.661 | 2.55 | | | 19.28 |
| 23 | −80.003 | 4.48 | 1.84666 | 23.8 | 19.07 |
| 24 | −23.546 | 1.00 | 1.91082 | 35.3 | 19.20 |
| 25 | −5,491.414 | 0.78 | | | 19.97 |
| 26* | 150.395 | 5.31 | 1.59282 | 68.6 | 20.62 |
| 27 | −26.674 | 0.15 | | | 21.74 |
| 28 | 43.433 | 2.43 | 1.49700 | 81.5 | 22.20 |
| 29 | 74.169 | 1.80 | 1.85478 | 24.8 | 22.03 |
| 30 | 34.669 | 70.79 | | | 21.66 |
| Image plane | ∞ | | | | |

Aspherical surface data

First surface

K = 0.00000e+000   A4 = 9.52408e−006   A6 = −5.58256e−009
A8 = −6.69290e−013   A10 = 3.71125e−014

Eighth surface

K = 0.00000e+000   A4 = −3.93791e−006   A6 = 1.77249e−008
A8 = −1.99486e−010   A10 = 5.98752e−013

Eighteenth surface

K = 0.00000e+000   A4 = −3.90034e−006   A6 = 2.26372e−010
A8 = −4.58729e−011   A10 = 1.24995e−013

Twenty-sixth surface

K = 0.00000e+000   A4 = −1.51211e−005   A6 = 6.09089e−009
A8 = −3.55927e−013   A10 = −8.25375e−015

Various data

| | |
|---|---|
| Focal length | 48.62 |
| F-number | 4.12 |
| Angle of view | 22.36 |
| Image height | 20.00 |
| Total lens length | 148.49 |
| BF | 70.79 |
| Entrance pupil position | 16.19 |

-continued (Numerical Data 4)
Unit: mm

| | |
|---|---|
| Exit pupil position | −31.24 |
| Front principal point position | 41.64 |
| Rear principal point position | 22.18 |

Lens unit data

| Unit | First surface | Focal length | Lens structure length | Front principal point position | Rear principal point position |
|---|---|---|---|---|---|
| 1 | 1 | −96.72 | 38.63 | −33.10 | −99.48 |
| 2 | 17 | 66.60 | 38.06 | 1.90 | −29.29 |

Single Lens data

| Lens | First surface | Focal length |
|---|---|---|
| 1 | 1 | −240.68 |
| 2 | 2 | −39.14 |
| 3 | 4 | −54.19 |
| 4 | 6 | 42.15 |
| 5 | 8 | −21.16 |
| 6 | 9 | 35.52 |
| 7 | 12 | 257.00 |
| 8 | 14 | −82.39 |
| 9 | 15 | 36.36 |
| 10 | 18 | 47.72 |
| 11 | 20 | −135.21 |
| 12 | 21 | −142.27 |
| 13 | 23 | 38.02 |
| 14 | 24 | −25.96 |
| 15 | 26 | 38.65 |
| 16 | 28 | 205.50 |
| 17 | 29 | −77.79 |

TABLE 1

| | Numerical Data 1 | Numerical Data 2 | Numerical Data 3 | Numerical Data 4 |
|---|---|---|---|---|
| T1 | Wide angle end: 2.55 Telephoto end: 4.89 | Wide angle end: 1.87 Telephoto end: 4.40 | Wide angle end: 2.06 Telephoto end: 8.12 | 3.61 |
| S1 | Wide angle end: −0.52 Telephoto end: −1.24 | Wide angle end: −0.53 Telephoto end: −1.27 | Wide angle end: −0.91 Telephoto end: −2.03 | −1.41 |
| T2 | Wide angle end: −4.49 Telephoto end: −1.60 | Wide angle end: −0.03 Telephoto end: 0.87 | Wide angle end: −1.38 Telephoto end: 0.81 | −1.26 |
| S2 | Wide angle end: −0.91 Telephoto end: −1.30 | Wide angle end: 0.82 Telephoto end: 1.27 | Wide angle end: −0.84 Telephoto end: −1.30 | 1.54 |
| M1 $\theta_{img}$ = 5.0 deg | Wide angle end: 0.98 Telephoto end: 0.78 | Wide angle end: 1.08 Telephoto end: 0.40 | Wide angle end: 2.25 Telephoto end: 1.17 | 2.04 |
| M2 $\theta_{img}$ = 5.0 deg | Wide angle end: −0.56 Telephoto end: −0.74 | Wide angle end: 0.43 Telephoto end: 0.25 | Wide angle end: −2.44 Telephoto end: −1.82 | 1.86 |
| Lp | Wide angle end: 24.73 Telephoto end: 99.88 | Wide angle end: 24.74 Telephoto end: 99.94 | Wide angle end: 31.15 Telephoto end: 129.92 | 48.62 |
| Conditional Expression (1) | 1.00 | 1.60 | 1.0 | 1.0 |
| Conditional Expression (2) | 1.00 | 0.40 | 1.6 | 1.0 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-220541, filed Nov. 16, 2017, and Japanese Patent Application No. 2018-202615, filed Oct. 29, 2018, which are hereby incorporated by reference herein in their entirety.

What is claimed is:

1. A processing apparatus, which is mounted to any one of a lens apparatus including an optical system and an image pickup apparatus configured to pick up an image formed by an optical system, the processing apparatus comprising a processor that executes a determination task configured to determine a first shift amount of a first shift lens unit and a second shift amount of a second shift lens unit, both of the first shift lens unit and the second shift lens unit being included in the optical system, and movable in a direction having a component perpendicular to an optical axis direction, wherein the determination task is configured to determine the first shift amount and the second shift amount based on state information representing an optical state of the optical system, optical information on each of the first shift lens unit and the second shift lens unit, which corresponds to the state information, and tilt information representing a predetermined object plane tilt amount.

2. A processing apparatus according to claim 1, wherein the state information includes information representing a focus position of the optical system.

3. A processing apparatus according to claim 1, wherein the state information includes information representing a zoom position of the optical system.

4. A processing apparatus according to claim 1, wherein the state information includes positional information on an object plane of the optical system, positional information on an image plane of the optical system, and positional information on a principal plane of the optical system.

5. A processing apparatus according to claim 1, wherein the optical information on each of the first shift lens unit and the second shift lens unit includes an image plane tilt sensitivity and a composition shift sensitivity.

6. A processing apparatus according to claim 1, wherein the determination task is configured to determine the first shift amount and the second shift amount such that the following conditional expression is satisfied:

$$0.3 < -M1 \times S1/M2 \times S2 < 1.7,$$

where S1 represents a composition shift sensitivity of the first shift lens unit, M1 represents the first shift amount, S2 represents a composition shift sensitivity of the second shift lens unit, and M2 represents the second shift amount.

7. A processing apparatus according to claim 1, wherein the determination task is configured to determine the first shift amount and the second shift amount such that the following conditional expression is satisfied:

$$0.3 < (M1 \times T1 + M2 \times T2)/\theta img < 1.7,$$

provided that $\theta img = \tan^{-1}(Lp \times \tan \theta obj/(Lo-Lp))$, where M1 represents the first shift amount, M2 represents the second shift amount, Lp represents a distance from a paraxial image plane to a principal plane of the optical system, Lo represents a distance from the paraxial image plane to an object plane of the optical system, T1 represents an image plane tilt sensitivity of the first shift lens unit, T2 represents an image plane tilt sensitivity of the second shift lens unit, θobj represents an object plane tilt amount, and θimg represents an image plane tilt amount obtained based on Scheimpflug principle.

8. A processing apparatus according to claim 1, wherein the determination task is configured to determine the first shift amount and the second shift amount based on an operation performed on an operation member, which enables a user to select an object plane tilt amount.

9. A lens apparatus comprising:
an optical system including a first shift lens unit and a second shift lens unit, both of the first shift lens unit and the second shift lens unit being movable in a direction having a component perpendicular to an optical axis direction; and
a processor that executes a determination task configured to determine a first shift amount of the first shift lens unit and a second shift amount of the second shift lens unit, wherein the determination task is configured to determine the first shift amount and the second shift amount based on state information representing an optical state of the optical system, optical information on each of the first shift lens unit and the second shift lens unit, which corresponds to the state information, and tilt information representing a predetermined object plane tilt amount.

10. A lens apparatus according to claim 9,
wherein the optical system consists of, in order from an object side to an image side, a front unit, an aperture stop, and a rear unit,
wherein the front unit includes the first shift lens unit, and
wherein the rear unit includes the second shift lens unit.

11. A lens apparatus according to claim 9, further comprising a controller configured to control movement of each of the first shift lens unit and the second shift lens unit based on the first shift amount and the second shift amount,
wherein the controller moves the first shift lens unit to change an object plane tilt amount.

12. A lens apparatus according to claim 11, wherein the controller is configured to move the second shift lens unit in such a direction as to reduce a shift of composition generated by moving the first shift lens unit.

13. A lens apparatus according to claim 11, wherein the controller is configured to keep a position of the first shift lens unit and a position of the second shift lens unit at moved positions until the optical state of the optical system and the predetermined object plane tilt amount change.

14. A lens apparatus according to claim 9,
wherein the optical system is a zoom lens,
wherein the state information includes information on a zoom position of the optical system and information on a focus position of the optical system,
wherein the optical apparatus further comprises:
a first detection circuitry that detects the information on the zoom position of the optical system; and
a second detection circuitry that detects the information on the focus position of the optical system, and
wherein the determination task is configured to use, as the state information, detection results obtained by the first detection circuitry and the second detection circuitry.

15. A lens apparatus according to claim 9,
wherein the optical system is a prime lens,
wherein the state information includes information on a focal length of the optical system and information on a focus position of the optical system,
wherein the optical apparatus further comprises a detection circuitry that detects the information on the focus position of the optical system, and
wherein the determination task is configured to use, as the state information, a detection result obtained by the detection circuitry.

16. A lens apparatus according to claim 9, further comprising a memory configured to store:
information representing a relationship between the state information and an image plane tilt sensitivity and a composition shift sensitivity of the first shift lens unit;
information representing a relationship between the state information and an image plane tilt sensitivity and a composition shift sensitivity of the second shift lens unit; and
information representing a relationship between the state information and positional information on an object plane of the optical system, positional information on an image plane of the optical system, and positional information on a principal plane of the optical system.

17. An image pickup apparatus, to and from which a lens apparatus including an optical system is attachable and detachable, the image pickup apparatus comprising:
a light receiving element configured to receive light of an image formed by the optical system; and
a processor that executes a plurality of tasks including:
an acquiring task configured to acquire state information representing an optical state of the optical system from the lens apparatus by communicating with the lens apparatus; and
a determination task configured to determine a first shift amount of a first shift lens unit and a second shift amount of a second shift lens unit, both of the first shift lens unit and the second shift lens unit being included in the optical system, and movable in a direction having a component perpendicular to an optical axis direction,
wherein the determination task is configured to determine the first shift amount and the second shift amount based on the state information, optical information on each of the first shift lens unit and the second shift lens unit, which corresponds to the state information, and tilt information representing a predetermined object plane tilt amount.

18. An image pickup apparatus according to claim 17, wherein the plurality of tasks further includes a transmission task configured to transmit, to the lens apparatus, the first shift amount and the second shift amount, which are determined by the determination task.

* * * * *